United States Patent

[11] 3,588,618

[72] Inventor Richard F. Otte
Los Altos, Calif.

[21] Appl. No. 15,685
[22] Filed Mar. 2, 1970
[45] Patented June 28, 1971
[73] Assignee Raychem Corporation
Menlo Park, Calif.

[54] UNSOLDERING METHOD AND APPARATUS USING HEAT-RECOVERABLE MATERIALS
23 Claims, 23 Drawing Figs.

[52] U.S. Cl. .......... 317/101CC, 29/626, 174/88R, 174/Dig. 8, 339/17C, 339/275B
[51] Int. Cl. .......... H05k 1/18, H05k 3/34
[50] Field of Search .......... 174/84 (Shrink Digest), 88; 317/101 (C), 101 (CC); 337/404, 405, 407, 393, 382, 140; 29/626—628; 339/17, 275

[56] References Cited

UNITED STATES PATENTS

| | | | |
|---|---|---|---|
| 2,465,540 | 3/1949 | Korn | 339/275BX |
| 3,198,914 | 8/1965 | Baran et al. | 337/405 |
| 3,304,396 | 2/1967 | Hasson | 337/407X |
| 3,403,238 | 9/1968 | Buehler et al. | 337/382UX |
| 3,513,429 | 5/1970 | Helsop | 174/dig.8UX |
| 3,516,082 | 6/1970 | Cooper | 337/382X |

*Primary Examiner*—Darrel L. Clay
*Attorney*—Lyon and Lyon

ABSTRACT: Heat-recoverable material such as TiNi is used for the electrical leads of a member so that such leads when soldered to other leads may be disconnected therefrom by first physically deforming at least the TiNi leads and then heating the solder joint to melt the solder and cause the TiNi leads to "recover," that is, to move back to their initial position before deforming and thereby separate the TiNi leads from the other leads.

INVENTOR
RICHARD F. OTTE
BY Lyon & Lyon
ATTORNEYS

INVENTOR
RICHARD F. OTTE
BY Lyon & Lyon
ATTORNEYS

INVENTOR
RICHARD F. OTTE
BY Lyon & Lyon
ATTORNEYS

UNSOLDERING METHOD AND APPARATUS USING HEAT-RECOVERABLE MATERIALS

This invention relates to disconnecting solder joints in electrical leads of the type used in electronic and other devices.

A multipin device, such as a dual inline package, known in the art as a "DIP," is often employed in a socket to facilitate removal in the field. DIP's that are soldered into printed circuit boards are difficult to remove without damage to the DIP or to the board.

The method of this invention makes it possible to achieve replaceability in the field without destroying the DIP or the board. This is accomplished by using a "heat-recoverable material" for the electrical leads to which the DIP leads are soldered.

As used herein, the term "heat-recoverable material" means the material which has been deformed from an original, heat-stable configuration to a different configuration in which it will remain until raised above a certain temperature, at which time it will return, or attempt to return, to its heat-stable configuration. Examples of such "heat-recoverable material" are the metallic alloy materials disclosed in U.S. Pat. Nos. 3,012,882 and 3,174,851, British Pat. No. 1,116,158 of 1968, and Belgian Pat. No. 703,649. As pointed out in these patents, the alloys undergo a transition at a certain temperature which, in the case of the gold-cadmium and silver-gold-cadmium alloys described in U.S. Pat. No. 3,012,882, is referred to as a "phase change. " Some of the other patents describe a transition which takes place in the disclosed alloys as one between Austenitic (or high temperature) and Martensitic (low temperature) forms of the material. I prefer to use an alloy of titanium and nickel of about 50–50 atom percent, designated hereinafter by the symbol "TiNi," although it is to be understood that any electrically conductive heat-recoverable material can be used. This could include a polymeric material which has been loaded or plated with a conductive material.

The certain temperature mentioned above is referred to herein as the "transformation temperature." It should be understood that the transformation temperature may be a temperature range, and that hysteresis usually occurs which causes the precise temperature at which a transition takes place to depend on whether the temperature is rising or falling. Also, the transformation temperature is affected by the stress imposed on the material, the temperature rising with increasing stress.

The transformation temperature of the TiNi is ordinarily above the operating temperature of the device. It may also be below the melting point of the solder as described below. The DIP or other multilead device is soldered to the TiNi terminals in the usual manner, the TiNi having been previously plated or clad with another metal, or in some way prepared so that it can be more readily sold soldered. Raising the temperature of the TiNi above its transformation temperature during the soldering operation has no effect on the geometric configuration because the TiNi is then in its heat-stable condition. After cooling, the TiNi terminals are then physically deformed but without breaking the solder joints. The other leads may or may not be deformed at the same time. Subsequent reheating of the soldered joints brings the deformed TiNi leads above the transformation temperature and, accordingly, the TiNi transforms or "recovers" to its initial configuration, because of its heat-recoverable property. The breaking of the solder joint occurs as the TiNi terminal moves away from the lead to which it was soldered as it undergoes a transformation and as the solder melts.

The TiNi is in the low temperature or Martensitic state prior to making the solder joint. After the solder joint has cooled and after the TiNi has been physically deformed, it is still in the same Martensitic state. Reheating after such deformation serves to melt the solder and cause the TiNi to transform. If the temperature at which the solder melts is below the transformation temperature of the TiNi (that temperature at which the material begins to transform from Martensite to Austenite and thereby change shape), the solder melts first and continued heating of the TiNi causes it to return to its original shape before deformation, thereby separating the TiNi lead from the other lead to which it was soldered.

If, however, the transformation temperature for the unstressed TiNi is below the melting point of the solder, reheating after deformation will first cause the TiNi to begin to transform and start to move back to its original shape, but since the solder has not yet melted, stress begins to build up in the TiNi lead. This increase in stress raises the transformation temperature to preclude further motion. Eventually the joint gets hot enough to melt the solder, thereby releasing the stress imposed on the TiNi lead. The transformation temperature then falls to the value that it has in the unstressed condition. Since that is well below the temperature at which the solder melts, the TiNi lead quickly transforms or recovers and moves to the initial position, separating the leads.

In the typical case, there is a distance between the position of the solder to be melted and the point on the heat-recoverable member where recovery is to take place. This difference is position does enable a temperature difference to exist between the transformation point and the melting point of the solder, and this feature can have practical use. For example, the solder can melt first and heat be conducted along the recoverable member to raise the point of recovery to the transition temperature, thus pulling the recoverable member away from the solder joint.

This ability to push the transformation temperature of the heat-recoverable material up to the melting point of the solder in this fashion offers several advantages. Among these are:

1. Heat-recoverable material can be used, even though its unstressed transformation temperature is below the melting point of the solder;
2. It is not necessary to control precisely the unstressed transformation temperature. It is only necessary to insure that the unstressed transformation temperature and the geometry are such that a sufficient amount of stress can be generated to raise the transformation temperature to the melting point of the solder. This allows heat-recoverable materials with widely varying unstressed transformation temperatures to be used. This is advantageous because slight variations in alloy compositions may have quite large temperature effects, and it is therefore difficult to control the transformation temperature precisely from sample to sample of material which is nominally the same;
3. The heat-recoverable material moves away to break the joint as soon as the solder melts. This helps to minimize the amount of heat that must be applied to the members of the joint. This is especially useful when heat is applied to the joint through the heat-recoverable material. In that case, the member comprising the heat-recoverable material moves quickly away from the other member and breaks not only the joint itself, but the heat-conduction path through which heat is being transferred. The temperature to which the second member is raised is thus minimized, and this is an important consideration in some instances such as when the second member is the electrical lead attached to a heat-sensitive electrical component;
4. A fourth advantage of changing the transformation temperature in this manner is that solders with different melting points can be used with the same heat-recoverable material, and still have the joint members move apart as soon as the melting point of the solder is reached.

Although it may appear upon initial or preliminary consideration that many of the features of this unsoldering method can be achieved by using a spring material instead of a heat-recoverable material, further analysis shows several advantages in favor of the heat-recoverable material. A first advantage of TiNi over a spring is that a spring can undergo a maximum fiber stress of only 0.6 percent in order to stay within its elastic range. TiNi, however, can undergo a fiber stress of 5 percent, and up to 8 percent in some cases, and still be in the heat-recoverable range. This means that a TiNi member can be bent to a substantially smaller radius than a spring of the same thickness. Alternatively, the TiNi member can be many times thicker than the spring material for the same radius.

Another advantage is that the TiNi does not snap away from the joint and throw hot liquid solder, such as a spring does. The TiNi member moves away quickly, but does not snap away.

A third advantage TiNi has is that, after it has been physically deformed, but before the joint is reheated, the joint itself is not under stress. It is placed under stress only after the TiNi has been heated above the unstressed transformation temperature. This fact means that cold flow does not take place to any substantial degree if the solder happens to undergo that phenomenon to an important degree. A spring, on the other hand, places the maximum amount of stress on the joint before it is heated at all. If the solder undergoes cold flow under the stress that results, the joint might be broken inadvertently before it is reheated. This result would be particularly undesirable if the joints were deformed either intentionally or accidentally long before they were reheated.

A fourth advantage of heat-recoverable material such as TiNi over a spring is that no auxiliary holding device is required to hold the TiNi in the deformed condition before the joint is reheated, as is usually the case with spring material. Such auxiliary devices are usually some type of snap or fastener which operates to hold the spring in the deformed condition. A related difficulty with the spring material is that there may be considerable stress on the second member and its semirigid support after deformation and before reheating. The cumulative effect on a support that has many "second members" can result in very high stress that could lead to damage. This is not a problem with heat-recoverable material because the latter does not put high stress on the second member after it is deformed and before it is reheated.

Figure 1:
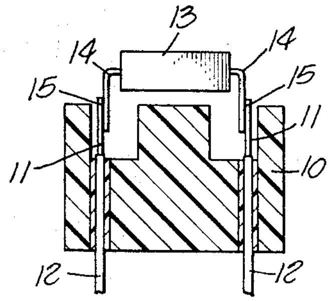
FIG. 1 is a diagrammatic section view showing a preferred form of apparatus for carrying out the method of this invention, the electrical leads being shown after soldering but before physical deformation.

Referring to the drawings, a terminal body 10 shown in FIGS. 1—4 is formed of insulating material and supports a plurality of electrical leads 11 positioned in two rows and each having an insulating cover or sheath 12 encircling heat-recoverable material such as, for example, an alloy of titanium and nickel of about 50—50 atom percent, and referred to as TiNi. An electronic component 13 known as a DIP (dual inline package) has a plurality of electrical leads 14 each connected by a solder joint 15 to one of the leads 12, respectively, on the terminal block 10. The solder joints 15 are formed in the usual manner. The TiNi leads 11 have been previously treated, as described above, to facilitate the soldering operation.

Figure 2:
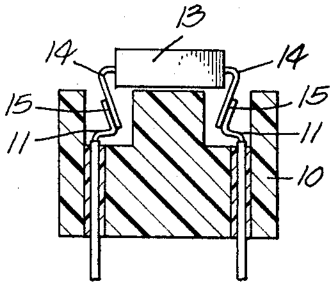
FIG. 2 is a view similar to FIG. 1 showing the parts after deformation of the electrical leads.

After cooling, the electrical leads 11 and 14 are physically deformed to a position such as, for example, as shown in FIG. 2, without breaking the solder joints 15. This step of physical deformation may take place soon after the solder has cooled, or it may not take place until it is desired to remove the DIP 13 from the terminal block 10.

Figure 3:
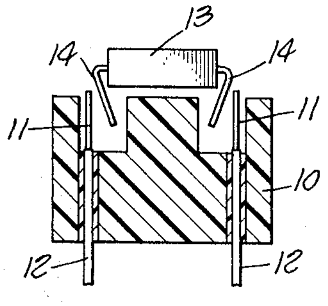
FIG. 3 is a view similar to FIGS. 1 and 2 showing the solder joints disconnected following reheating of the electrical leads to melt the solder and cause the heat-recoverable material of certain of the electrical leads to return to their original shape before deformation.
Figure 4:
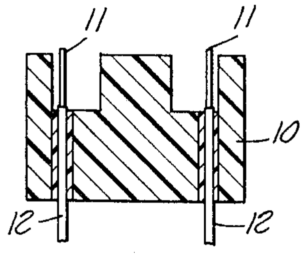
FIG. 4 is a view similar to FIGS. 1, 2 and 3 showing the multiple-lead component removed, and the remaining parts ready for resoldering to a new electrical component.

When it is desired to remove the DIP 13, heat is applied in any convenient manner to melt the solder joints 15. The same heating operation causes the TiNi leads 11 to return to their initial positions as shown in FIG. 1, thereby separating the leads 11 and 14 as shown in FIG. 3. The DIP 13 may then be removed, and the parts are then in the position shown in FIG. 4, ready for solder connection to a new DIP.

Figure 5:
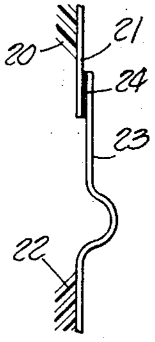
FIG. 5 is a diagrammatic view of two electrical leads soldered together, the lower lead formed of heat-recoverable material, and the parts being shown in position after soldering but before physical deformation.
Figure 6:
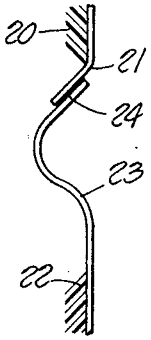
FIG. 6 is a view similar to FIG. 5 showing the position of the leads after physical deformation has taken place.
Figure 7:
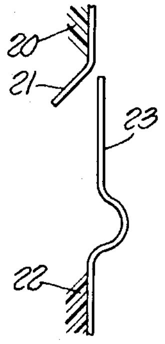
FIG. 7 is a view similar to FIGS. 5 and 6 showing the position of the electrical leads after reheating to melt the solder and to cause the lower lead to return to its initial position.

The same unsoldering method is illustrated in FIGS. 5, 6 and 7. The semirigid mount 20 carries the electrical lead 21, and the semirigid mount 22 carries the TiNi lead 23. The leads 21 and 23 are connected by making a solder joint 24 of conventional-type between them. The leads are then physically deformed to the shape as shown in FIG. 6, without breaking the solder joint 24. Subsequently, upon applying heat by any convenient means, the solder of the joint 24 melts and the heat causes the heat-recoverable material of the lead 23 to return to its initial position, thereby separating the leads 21 and 23, as shown in FIG. 7.

Figure 8:
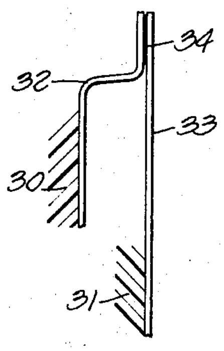
FIG. 8 is another diagrammatic view showing a solder joint between two electrical leads, the lead on the right being formed of heat-recoverable material, and the parts being shown after soldering but prior to physical deformation.
Figure 9:
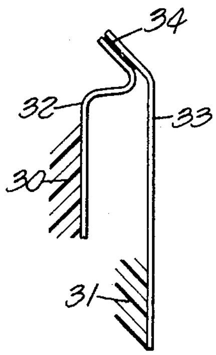
FIG. 9 is a view similar to FIG. 8 showing the position of the leads after they have been physically deformed.
Figure 10:
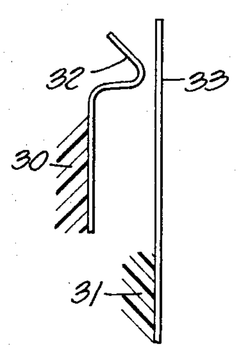
FIG. 10 is a view similar to FIGS. 8 and 9 after reheating to melt the solder and to cause the heat-recoverable lead to return to its initial position.

In FIGS. 8, 9 and 10, the same method of unsoldering is shown but with the geometry of the electrical leads arranged in somewhat different position. Thus, the semirigid mounts 30 and 31 support the electrical leads 32 and 33, respectively, the lead 33 being formed of heat-recoverable material such as, for example, TiNi. The solder joint 34 is formed to connect the leads 32 and 33, as shown in FIG. 8. The leads 32 and 33 are then deformed, as shown in FIG. 9, without breaking the solder joint 34. Subsequently, upon reheating, the solder melts and the lead 33 returns to its initial position, because of its heat-recovery property, thereby forming a physical gap between the leads 32 and 33.

Figure 11:
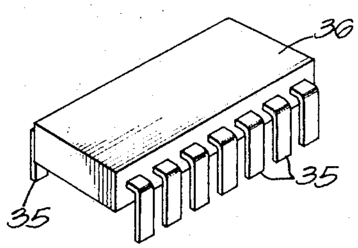
FIG. 11 is a perspective view of a dual inline package known in the art as a DIP, the particular device illustrated having 14 leads.
Figure 12:
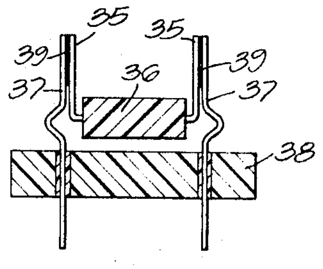
FIG. 12 is a sectional view showing a similar device connected to heat-recoverable leads mounted on a terminal body, the parts being shown after soldering but before physical deformation of the heat-recoverable leads.
Figure 13:
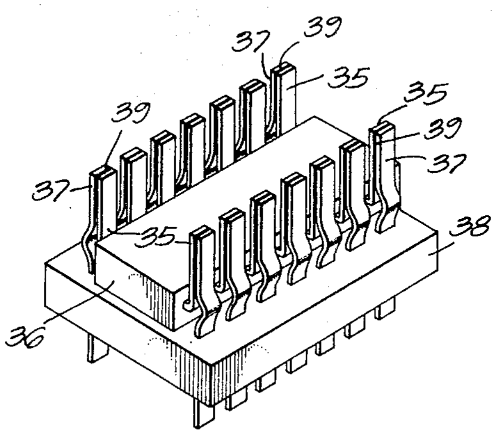
FIG. 13 is a perspective view of the apparatus shown in FIG. 12.

FIGS. 11, 12 and 13 show how the same unsoldering method may be employed for the multiple-leads 35 of the electrical component 36 and the heat-recoverable leads 37 mounted on the terminal block 38. Solder joints 39 are formed to connect the leads 35 individually to the leads 37. Prior to the unsoldering operation, all of the leads are bent inwardly without breaking the solder joints. Upon subsequent heating, the solder joints are melted and the leads 37 return to their upright position to form a physical gap between each pair of leads previously soldered together.

Figure 14:
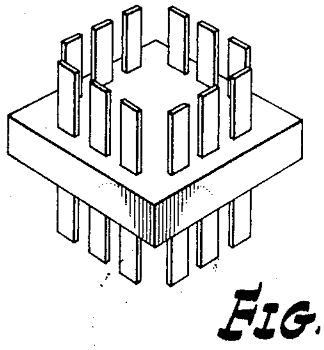
FIG. 14 shows a terminal body with electrical leads arranged in a square.
Figure 15:
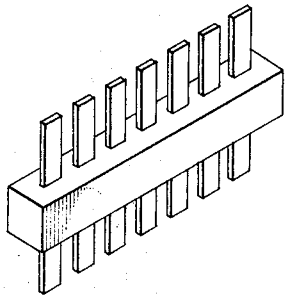
FIG. 15 shows a terminal body with electrical leads projecting from opposite sides.
Figure 16:
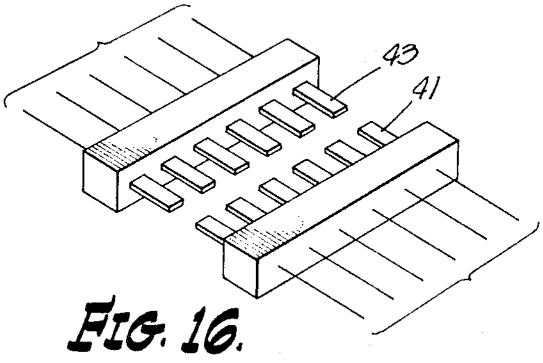
FIG. 16 shows two terminal bodies, one having heat-deformable material comprising the electrical leads, the parts being shown before soldering.
Figure 17:
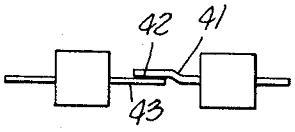
FIG. 17 is an end view of the device of FIG. 16 after soldering.
Figure 18:
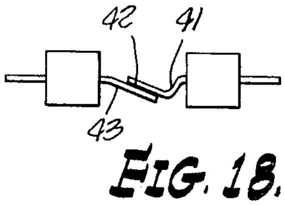
FIG. 18 is a similar view after physical deformation.
Figure 19:
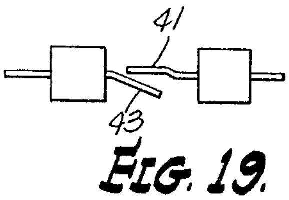
FIG. 19 is a similar view after reheating to melt the solder and cause the heat-deformable leads to return to their initial positions.

The electrical leads may be arranged in any convenient or desirable pattern, such as the square shown in FIG. 14, the straight line shown in FIG. 15, or the two parallel lines shown in FIG. 16. FIG. 14 is an illustration of an alternative arrangement of the type of device shown in FIG. 13. FIG. 15 illustrates materials which could be sold in strip form for use by customers in any length desired. These would be used for wire-to-wire connectors. FIG. 16 illustrates other devices for use in wire-to-board connections, which can also be sold in indefinite lengths. These particular patterns are by way of illustration only, and other patterns may be employed. FIGS. 17, 18 and 19 show steps in the same unsoldering method. Thus, FIG. 17 shows the heat-recoverable leads 41 connected by solder joints 42 to the leads 43. After the physical deformation as shown in FIG. 18, reheating melts the solder and causes the heat-recoverable leads 41 to return to their initial position, as shown in FIG. 19, thereby creating a physical gap between each pair of leads previously soldered together.

Figure 20:
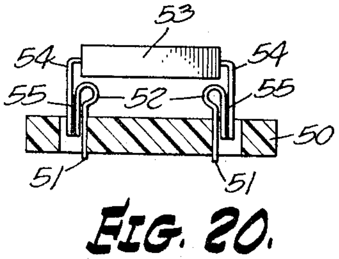
FIG. 20 is a sectional view showing another manner of carrying out the method of this invention, and illustrating a DIP having electrical leads individually soldered to heat-recoverable leads mounted on a terminal body, the parts being shown after soldering but before deformation.
Figure 21:
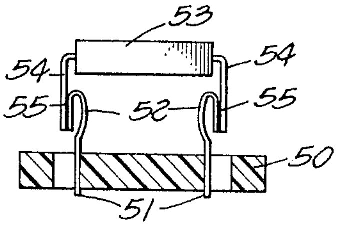
FIG. 21 shows the same device after physical deformation of the heat-recoverable leads.
Figure 22:
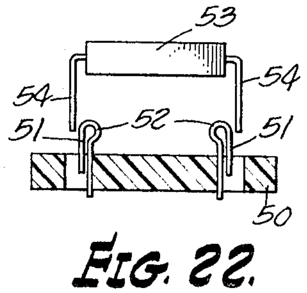
FIG. 22 shows the same device after reheating to melt the solder joints and to cause the heat-recoverable leads to return to their initial positions.

FIGS. 20—22 show a variation of the unsoldering method in which only the heat-recoverable leads are physically deformed. As shown in FIG. 20, the terminal block 50 supports heat-recoverable leads 51 and each of these is provided with a loop 52 underlying the portion of the DIP 53. The electrical leads 54 of the DIP are connected by solder joints 55 to the free end portions of the leads 51. When it is desired to remove the DIP 53, it is physically raised away from the block 50 to deform the heat-recoverable leads 51, as shown in FIG. 21. Upon reheating, the solder joints melt and the heat-recoverable leads 51 return to their initial position, as shown in FIG. 22, separating the leads 51 from the leads 54. The DIP 53 may then be removed and a new one installed. In the reheating operation, with the parts in the position shown in FIG. 21, the increased clearance distance between the DIP 53 and the terminal block 50 aids in the dissipation of heat, so that air can flow around the device much more freely and provide better heat exchange.

Figure 23:
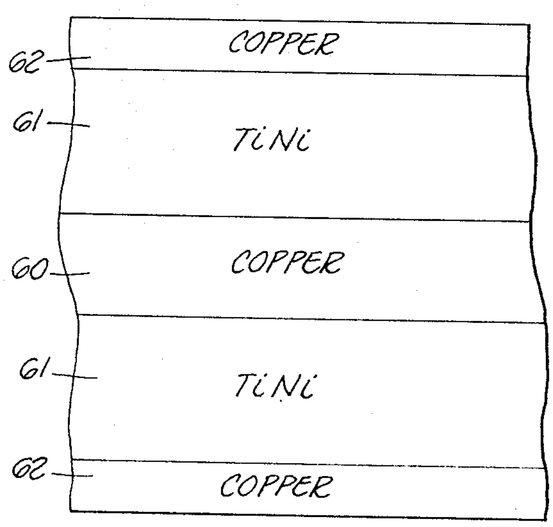
FIG. 23 is a sectional view on an enlarged scale showing the cross section of a composite electrical lead which includes heat-recoverable material.

A characteristic of TiNi that is troublesome in some applications is its low electrical and thermal conductivity, as compared to copper. Plating or cladding the surface with copper or some other high conductivity material produces a marked improvement. The composite lead shown in enlarged cross section in FIG. 23 has a central layer 60 of copper confined between two layers 61 of TiNi, together with a surface coating 62 of copper. The copper strip 60 is placed in the center of the deformable member along the neutral axis. This minimizes the amount of deformation of the central copper strip 60 and minimizes the amount of work-hardening which it undergoes during deformation, which in turn maximizes the amount of attainable recovery. Moreover, when the center layer 60 is very thin, it is always in the elastic region when the composite member is bent. In such case the recovery approaches 100 percent, as the center layer 60 of copper does not work-harden. The five-layer composite as shown in FIG. 23 is solderable, and has electrical and thermal conductivity on the order of three times greater than that of the TiNi alone.

Another advantage of the present invention is that the leads are self-straightening and can thus be subjected to abuse which would render ordinary wires and connections inoperative. Also, devices constructed in accordance with the invention have the advantage that no force is required to make the connection. This is an important point, since the prior art devices can be damaged when connections are being made, or they can cause damage to other pieces of equipment.

Having fully described my invention, it is to be understood that I am not to be limited to the details herein set forth but that my invention is of the full scope of the appended claims.

I claim:

1. The method of making a detachable soldered connection, comprising: joining two electrical leads with hot liquid solder, the first of said leads comprising heat-recoverable material, allowing the solder to cool and solidify to form a connection between the leads, physically deforming at least the said first lead from its position during soldering, whereby upon subsequent heating of the parts to melt the solder the heat-recoverable material in said first lead moves it away from the other lead to break the connection.

2. The method set forth in claim 1 in which both of said leads are physically deformed.

3. The method set forth in claim 1 in which the transformation temperature of the heat-recoverable material is above the melting temperature of the solder.

4. The method set forth in claim 1 in which the heat-recoverable material is a metal.

5. The method set forth in claim 1 in which the heat-recoverable material is an alloy of titanium and nickel.

6. The method of making detachable soldered connections between a plurality of pairs of electrical leads, comprising: joining pairs of electrical leads with hot liquid solder, the first lead of each pair comprising heat-recoverable material, allowing the solder to cool and solidify to form a connection between each pair of leads, physically deforming at least the said first lead in each pair from its position during soldering, whereby upon subsequent heating of the parts to melt the solder the heat-recoverable material in each of said first leads moves it away from the other lead of each pair to break the connection therebetween.

7. The method set forth in claim 6 in which both of the leads in each pair are physically deformed.

8. The method set forth in claim 6 in which the transformation temperature of the heat-recoverable material is above the melting temperature of the solder.

9. The method set forth in claim 6 in which the leads are deformed simultaneously.

10. The method of making detachable soldered connections between a plurality of electrical leads of a first member and a plurality of electrical leads of a second member, comprising: joining pairs of electrical leads with hot liquid solder, one of each pair of leads being attached to the first member and the other being attached to the second member, one of the leads of each pair comprising heat-recoverable material, allowing the solder to cool and solidify to form a connection between each pair of leads, moving one member relative to the other to physically deform at least the heat-recoverable lead in each pair from its position during soldering, whereby upon subsequent heating of the parts to melt the solder the heat-recoverable material moves its respective lead away from the other lead of each pair to break the connection therebetween.

11. The method set forth in claim 10 in which both of the leads in each pair are physically deformed.

12. The method set forth in claim 10 in which the transformation temperature of the heat-recoverable material is above the melting temperature of the solder.

13. The method set forth in claim 10 in which the leads are deformed simultaneously.

14. In combination: first and second members each having at least one electrical lead, a solder joint connecting the lead of one member to the lead of the other member, the electrical lead of the first member comprising heat-recoverable material physically deformed after soldering, whereby upon heating of the electrical leads and solder joint to melt the solder, the electrical lead comprising the heat-recoverable material moves away from the other electrical lead to disconnect the solder joint.

15. The apparatus of claim 14 in which the transformation temperature of the heat-recoverable material is above the melting temperature of the solder.

16. The apparatus of claim 14 in which the heat-recoverable material is a metal.

17. In combination: first and second members each having a plurality of electrical leads, a plurality of solder joints each connecting one lead of one member to one lead of the other member, respectively, the electrical leads of the first member comprising heat-recoverable material physically deformed after soldering, whereby upon heating of the electrical leads and solder joints to melt the solder each of the electrical leads of the first member move away from the other electrical leads respectively to disconnect each of the solder joints.

18. The apparatus of claim 17 in which the transformation temperature of the heat-recoverable material is above the melting temperature of the solder.

19. The apparatus of claim 17 in which the heat-recoverable material is a metal.

20. A member having a plurality of electrical leads each comprising heat-recoverable material, each of the leads being treated to permit connection by solder to other electrical elements, and each of the leads being capable of being physically deformed after soldering.

21. The device of claim 20 in which the heat-recoverable material is a titanium-nickel alloy of about 50–50 atom percent.

22. A multiple-layer electrical lead comprising: a central core of metal of high electrical conductivity, two layers of heat-recoverable material, one layer bonded to each side of the central core, respectively, and two layers of metal of high electrical conductivity, one layer bonded to and covering each layer of heat-recoverable material, respectively.

23. The article of claim 22 in which the central core and the latter two said layers are formed of copper, and the heat-recoverable layers are formed of an alloy of titanium and nickel.